United States Patent
Liu et al.

(10) Patent No.: US 12,098,099 B2
(45) Date of Patent: Sep. 24, 2024

(54) POLYCARBOXYLIC ACID WATER-REDUCING AGENT WITH HIGH ADAPTABILITY TO TEMPERATURE AND METHOD FOR PREPARING THE SAME

(71) Applicants: Sobute New Materials Co., Ltd., Nanjing (CN); Bote Building Materials (Tianjin) Co., Ltd., Tianjin (CN)

(72) Inventors: Jiaping Liu, Nanjing (CN); Zhen Huang, Nanjing (CN); Yong Yang, Nanjing (CN); Qianping Ran, Nanjing (CN); Xin Shu, Nanjing (CN); Shentong Li, Nanjing (CN); Han Yan, Nanjing (CN); Hongxia Zhao, Nanjing (CN)

(73) Assignees: SOBUTE NEW MATERIALS CO., LTD., Nanjing (CN); BOTE BUILDING MATERIALS (TIANJIN) CO., LTD., Tianjin (CN)

( * ) Notice: Subject to any disclaimer, the term of this patent is extended or adjusted under 35 U.S.C. 154(b) by 748 days.

(21) Appl. No.: 17/272,643

(22) PCT Filed: Apr. 18, 2019

(86) PCT No.: PCT/CN2019/083236
§ 371 (c)(1),
(2) Date: Mar. 1, 2021

(87) PCT Pub. No.: WO2020/133822
PCT Pub. Date: Jul. 2, 2020

(65) Prior Publication Data
US 2022/0041505 A1 Feb. 10, 2022

(30) Foreign Application Priority Data
Dec. 29, 2018 (CN) .......................... 201811643991.X

(51) Int. Cl.
C04B 24/26 (2006.01)
C08F 283/06 (2006.01)
C04B 103/30 (2006.01)

(52) U.S. Cl.
CPC ...... *C04B 24/2694* (2013.01); *C08F 283/065* (2013.01); *C04B 2103/302* (2013.01)

(58) Field of Classification Search
None
See application file for complete search history.

(56) References Cited

U.S. PATENT DOCUMENTS

2005/0045070 A1  3/2005  Nakata et al.
2015/0291716 A1* 10/2015  Liu ..................... C04B 24/2647
                                                                    524/833
2016/0333129 A1* 11/2016  Hofmann ........... C08G 18/4072

FOREIGN PATENT DOCUMENTS

| CN | 101786824 A | 7/2010 |
| CN | 102153711 A | 8/2011 |
| CN | 106905493 A | 6/2017 |
| CN | 107337766 A | 11/2017 |
| CN | 108752537 A | 11/2018 |
| EP | 2937321 A1 | 10/2015 |

OTHER PUBLICATIONS

ISA China National Intellectual Property Administration, International Search Report Issued in Application No. PCT/CN2019/083236, Sep. 27, 2019, WIPO, 4 pages.
Zhang, H. et al., "Study on synthesis of polycarboxylate superplasticizer with maleic anhydride," College of Materials Science and Engineering, Henan Polytech University, 2013, 4 pages.
State Intellectual Property Office of the People's Republic of China, Office Action and Search Report Issued in Application No. 201811643991.X, Feb. 10, 2021, 11 pages. (Submitted with Partial Translation).

* cited by examiner

*Primary Examiner* — Anthony J Frost
(74) *Attorney, Agent, or Firm* — McCoy Russell LLP

(57) ABSTRACT

The present invention discloses a polycarboxylic acid water-reducing agent with high adaptability to temperature and a method for preparing the same. The polycarboxylic acid water-reducing agent is prepared by introducing an unsaturated macromonomer D with a temperature-sensitive side chain which could be bonded to the backbone of the polycarboxylic acid through free radical polymerization. The polycarboxylic acid water-reducing agent prepared by the invention has an adsorption group density that can be automatically adjusted with the change of ambient temperature, and thereby shows similar dispersing capability and dispersion retention capability at different ambient temperatures, demonstrating high adaptability to different ambient temperatures. It can be used in a larger temperature range with a constant dosage, which is beneficial to further popularization and application of the polycarboxylic acid water-reducing agent in regions of different climates.

9 Claims, No Drawings

POLYCARBOXYLIC ACID WATER-REDUCING AGENT WITH HIGH ADAPTABILITY TO TEMPERATURE AND METHOD FOR PREPARING THE SAME

CROSS REFERENCE TO RELATED APPLICATIONS

The present application is a U.S. National Phase of International Application No. PCT/CN2019/083236 entitled "POLYCARBOXYLIC ACID WATER-REDUCING AGENT WITH HIGH ADAPTABILITY TO TEMPERATURE AND PREPARATION METHOD THEREFOR," and filed on Apr. 18, 2019. International Patent Application No. PCT/CN2019/083236, which claims priority to Chinese Patent Application No. 201811643991.X filed on Dec. 29, 2018. The entire contents of each of the above-listed applications are hereby incorporated by reference for all purposes.

TECHNICAL FIELD

The present invention relates to a polycarboxylic acid water-reducing agent which can automatically adjust the density of adsorption groups with the change of the ambient temperature, and thereby shows similar dispersing capability and dispersion retention capability at different ambient temperatures, and to a method for preparing the same, pertaining to the technical field of concrete admixtures.

BACKGROUND

Polycarboxylic acid water-reducing agents, because of their high water-reducing capability, excellent slump resistance performance and green production process, have gradually become the mainstream of the market instead of the second-generation water-reducing agents. However, with the further expansion of application scope, a series of problems have emerged, among which the outstanding problem is the inadaptability to temperature. Dispersing capability and dispersion retention capability of the polycarboxylic acid water-reducing agents are greatly affected by the ambient temperature. When the ambient temperature is high, the initial dispersion capability is excessively strong, but the dispersion retention capability is very poor, and it is difficult for fresh concrete to obtain the desired application performance; however, when the ambient temperature is low, it is difficult to show dispersing capability at the initial stage, and there is a need to increase the dosage of the water-reducing agent, which, however, will cause excess liquidity in the later stage, and cause segregation and bleeding of the concrete, thus affecting strength and durability of the hardened concrete.

China has a vast territory with great climate differences. For additive manufacturers, it is necessary to prepare a variety of formulations for different ambient temperatures, which undoubtedly puts forward higher requirements for production and supply. In addition, there is a great temperature difference between day and night in some areas, and it is unrealistic to try to adopt different additive formulations for different temperatures in these areas.

The fundamental reason for all these problems lies in the significant correlation between the adsorption kinetics of the polycarboxylic acid water-reducing agent and temperature. The polycarboxylic acid water-reducing agent is a comb-shaped polymer with carboxyl as an adsorption group and polyoxyethylene as a side chain, and needs to be adsorbed to the surface of cement particles by the charge action between carboxyl and the surface of the cement particles before plays the dispersing role through spatial mutual repulsion of the side chains. That is to say, effective adsorption is the premise for the dispersing capability of the polycarboxylic acid water-reducing agent, and its adsorption behavior is greatly affected by the ambient temperature: since polycarboxylic acid adsorbs very fast at a high temperature, it has a strong initial dispersing capability. However, due to too much initial adsorption and less supplementary adsorption at a later stage, the dispersion retention capability is weak, the adsorption at a low temperature is slow, and it is necessary to increase the dosage to ensure the initial dispersing capability; however, too much continuous adsorption at a later stage leads to excessive dispersing capability at a later stage and too low yield stress of the concrete, resulting in bleeding and segregation.

Chinese patent CN108752537A introduced, for graft copolymerization, a small amount of a rigid functional monomer additive with a large three-dimensional spatial structure prepared by acylation of fumaric acid and polyethyleneimine, during the synthesis of a water-reducing agent, so as to optimize the distribution of the backbone and side chain of the polycarboxylic acid molecules. In this way, the steric hinerance effect of the water-reducing agent can be increased and the water-reducing rate thereof can be improved; meanwhile, the functional monomer has a stable structure, is insensitive to the change of the ambient temperature, and thus can be used within a large temperature range with a constant dosage.

SUMMARY

In order to solve the problem that the conventional polycarboxylic acid water-reducing agent is sensitive to temperature, by controlling an influence direction of a self charge density of polycarboxylic acid on adsorption to be opposite to an influence direction of the external environment temperature so that the influence effects of the two are partially offset, the present invention provides a polycarboxylic acid water-reducing agent with high adaptability to temperature.

The main reason why the existing polycarboxylic acid water-reducing agent does not adapt to the ambient temperature is that the adsorption behavior is significantly affected by the ambient temperature, and the adsorption behavior is mainly affected by an external factor of the ambient temperature and an internal factor of the self charge density of the polycarboxylic acid.

Based on the above ideas, the present invention introduces an unsaturated macromonomer with a temperature-sensitive side chain in the synthesis process of the polycarboxylic acid water-reducing agent. The macromonomer contains unsaturated double bonds which can be bonded to the backbone of polycarboxylic acid by free radical polymerization. On the other hand, the macromonomer contains the temperature-sensitive side chain, which can enable the synthesized polycarboxylic acid water-reducing agent to have a certain temperature sensitivity. When the temperature rises, the molecular backbone of polycarboxylic acid will curl up more, thus reducing the number of exposed adsorption groups and naturally slowing down the adsorption; when the temperature decreases, the backbone of polycarboxylic acid returns to a more stretched state, the number of exposed adsorption groups increases, and adsorption naturally becomes faster. Therefore, the polycarboxylic acid water-reducing agent can automatically change the density of adsorption groups with the change of temperature, and the adsorption behavior is basically consistent at different temperatures, thus improving the adaptability to temperature.

In order achieve the above purpose, the present invention firstly provides a method for preparing an unsaturated macromonomer D, including: carrying out a step-by-step addition polymerization reaction of polyethylene glycol A of a certain molecular weight with a lactone or lactam monomer B to obtain an intermediate product C; and reacting the intermediate product C with maleic anhydride to obtain the unsaturated macromonomer D containing a double bond at a terminal end and a temperature-sensitive side chain;

the polyethylene glycol A is commercial polyethylene glycol with hydroxyl at a terminal end, and a number-average molecular weight of 1000-2000;

in the step-by-step addition polymerization reaction of the polyethylene glycol A with the lactone or lactam monome B, and a mass fraction of the monomer B with respect to the substance A is 30-50%; by adjusting the relative proportion of the hydrophilic segment and the hydrophobic segment, the conformational change of the polycarboxylic acid plasticizer is controlled, so that "exposed" adsorption groups dynamically change with the temperature, and a temperature window of the dynamic change of the exposed adsorption groups is ensured to coincide with the actual operating temperature of the concrete; too high or too low proportion will affect the temperature sensitivity of the adsorption behavior of the synthesized water-reducing agent, and then affect its dispersion performance;

a molar ratio of the intermediate product C to the maleic anhydride is 1:2.

Preferably, the unsaturated macromonomer D of the present invention is specifically prepared by a method including the following steps:

(1) preparation of the intermediate product C: adding polyethylene glycol A into a reaction flask, removing oxygen in a system by vacuumizing and introducing nitrogen for three times, then adding stannous octoate as a catalyst and heating to a set temperature, adding the lactone or lactam monomer B dropwise for a ring-opening polymerization reaction after addition of the catalyst is finished, with a dropwise addition time controlled within 2 hours to 5 hours, holding the temperature after the reaction is finished, and then cooling to a room temperature to obtain the intermediate product C;

the set temperature in the step (1) is 100-120° C.;

in the step (1), the polyethylene glycol A and the lactone or lactam monomer B are subjected to a step-by-step addition polymerization reaction at 120-140° C., and a total time for reaction and holding the temperature is 20-24 hours;

(2) preparation of the monomer D: reacting the intermediate product C prepared in the step (1) with maleic anhydride at 50-80° C. for 5-10 hours to obtain the monomer D containing the double bond at the terminal end and the temperature-sensitive side chain;

the lactone or lactam monomer B in the step (1) is selected from the group consisting of ε-caprolactone, caprolactam, lactide, glycolide, and mixtures thereof.

Preferably, in the step (1), the polyethylene glycol A and the lactone or lactam monomer B are subjected to a step-by-step addition polymerization reaction using stannous octoate as a catalyst, a mass of which is 0.05-0.2% of a total mass of the monomer A and the monomer B. Too little catalyst leads to poor catalysis effect and poor reaction effect, and too much catalyst is unnecessary.

Another aspect of the present invention provides a polycarboxylic acid water-reducing agent, which can automatically adjust the density of adsorption groups with the change of the ambient temperature, and thereby shows similar dispersing capability and dispersion retention capability at different ambient temperatures; the polycarboxylic acid water-reducing agent is prepared by free radical polymerization of the unsaturated macromonomer D with temperature sensitivity, an unsaturated carboxylic acid monomer E and an unsaturated polyether macromonomer F;

a molar ratio of the unsaturated carboxylic acid monomer E to the polyether macromonomer F is 2.0-10.0; if the dosage amount of the monomer E is too small, there will be fewer adsorption groups, the adsorption capacity will be weak and the dispersion performance will be poor; while if the dosage amount of monomer E is too large, the product will have too strong adsorption and too weak steric hindrance, which will also affect the dispersion performance; and a mass of the unsaturated macromonomer D with temperature sensitivity is 5-10% of a total mass of the monomer E and the monomer F; if the dosage is too low, the temperature-sensitive effect is not significant, which makes it difficult to dynamically adjust the density of adsorption groups; if the dosage is too high, the crosslinking effect is excessively significant, which leads to excessively strong hydrophobicity and affects the dispersing capability.

Preferably, the unsaturated carboxylic acid monomer E is represented by a general formula (1):

where $R_3$ is H, methyl or $CH_2COOM$, $R_4$ is H or COOM, and M is H, an alkali metal ion, an ammonium ion, or an organic amine group; in the present invention, the unsaturated carboxylic acid monomer E mainly provides adsorption groups;

the unsaturated polyether macromonomer F is represented by a general formula (2):

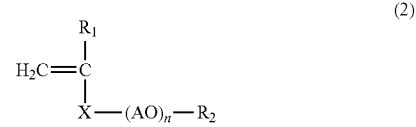

where $R_1$ is H or methyl; $R_2$ is H or C1-C4 alkyl, X is COO, O, $O(CH_2)_mO$, $CH_2O$ or $CH_2CH_2O$, m is an integer selected from 2 to 4; AO is selected from the group consisting of oxyalkylene groups with 2-4 carbon atoms and mixtures thereof in arbitrary proportions, n is an average addition mole number of AO, and is an integer selected from 20 to 100; $(AO)_n$ is a homopolymerized, randomly copolymerized, diblock copolymerized, or multiblock copolymerized structure. The polyether macromonomer F participates in polymerization to form a hydrophilic long side chain, which provides steric hindrance stabilization and shows water-reducing performance.

Preferably, the unsaturated carboxylic acid monomer E is selected from the group consisting of acrylic acid, methacrylic acid, maleic acid, sodium salt, potassium salt and ammonium salt of acrylic acid, methacrylic acid and maleic acid, and mixtures thereof in arbitrary proportions. These monomers are commercially available.

Preferably, the unsaturated polyether macromonomer F is selected from methyl allyl polyethylene glycol, isopentenyl polyethylene glycol, allyl polyethylene glycol, vinyl polyethylene glycol, hydroxybutyl vinyl polyethylene glycol or a mixture thereof in an arbitrary proportion. These monomers can be either commercially available or prepared according to the methods described in the published patents or non-patent documents According to the present invention, a method for preparing the polycarboxylic acid water-reducing agent specifically includes:

adding a mixed aqueous solution of a polyether macromonomer F and an oxidant O into a reaction vessel before a polymerization reaction starts; heating to a set polymerization temperature, removing oxygen by introducing nitrogen and vacuumizing, then dropwise adding a mixed aqueous solution of an unsaturated carboxylic acid monomer E, an unsaturated macromonomer D with temperature sensitivity, a reductant R and a chain transfer agent T into the reaction vessel for the polymerization reaction, and reacting at a constant temperature for a period of time after dropwise addition is finished to obtain the polycarboxylic acid water-reducing agent;

a polymerization concentration is 30-60 wt %, a polymerization temperature is 30-60° C., an addition time of the mixed aqueous solution of the monomer E, the unsaturated macromonomer D with temperature sensitivity, the reductant R and the chain transfer agent T is controlled within 2-5 hours, and the reaction at the constant temperature is continued for 1-3 hours after the addition is finished.

Preferably, a redox-based initiator is adopted for the polymerization, the oxidant O is selected from hydrogen peroxide, potassium persulfate, ammonium persulfate, sodium persulfate, or a mixture thereof, and a molar quantity of the oxidant O is 1-5% of a total molar quantity of polymerization monomers; the reductant R is selected from L-ascorbic acid, sodium formaldehyde sulfoxylate, ferrous sulfate heptahydrate, sodium bisulfite, or a mixture thereof, and a molar quantity of the reductant is 20-50% of a total molar quantity of the oxidant.

Preferably, the chain transfer agent T is used to adjust a polymerization rate and control the weight-average molecular weight of the product polycarboxylic acid water-reducing agent to be 20,000-100,000. If the molecular weight is too small or too large, its dispersing capability or dispersion retention capability to cement will decrease. The chain transfer agent T is selected from mercaptopropionic acid, mercaptoacetic acid, mercaptoethanol or a mixture thereof, and a molar quantity of the chain transfer agent is 1-5% of the total molar quantity of the polymerization monomers.

Compared with the prior art, the prepared polycarboxylic acid water-reducing agent has an adsorption group density that can be automatically adjusted with the change of the ambient temperature, therefore shows similar dispersing capacity and dispersion retention capacity at different ambient temperatures, demonstrating high adaptability to different ambient temperatures, and can be used within a larger temperature range under the condition of a constant dosage, which is beneficial to further popularization and application of the polycarboxylic acid water-reducing agent in regions of different climates.

DETAILED DESCRIPTION

The following examples describe the process of preparing the polymerization products according to the method of the present invention in more detail, and these examples are given by way of illustration, with the purpose of enabling those skilled in the art to understand the content of the present invention and implement it accordingly, but these examples are not intended to limit the scope of the present invention. All equivalent changes or modifications made according to the essence of the present invention should be covered within the protection scope of the present invention.

The reference signs of the raw materials used in examples and comparative examples are shown in Table 1:

TABLE 1

Signs of the raw material of synthetic examples and comparative examples

| Reference signs | Name of monomers | Source |
| --- | --- | --- |
| A1 | polyethylene glycol(a molecular weight of 1000) | commercially available |
| A2 | polyethylene glycol(a molecular weight of 1500) | commercially available |
| A3 | polyethylene glycol(a molecular weight of 2000) | commercially available |
| A4 | polyethylene glycol(a molecular weight of 600) | commercially available |
| A5 | polyethylene glycol(a molecular weight of 4000) | commercially available |
| B1 | ε-caprolactone | commercially available |
| B2 | caprolactam | commercially available |
| B3 | lactide | commercially available |
| B4 | glycolide | commercially available |
| E1 | acrylic acid | commercially available |

TABLE 1-continued

Signs of the raw material of synthetic examples and comparative examples

| Reference signs | Name of monomers | Source |
|---|---|---|
| E2 | methacrylic acid | commercially available |
| E3 | maleic acid | commercially available |
| F1 | methyl allyl polyethylene glycol (a molecular weight of 1200, $R_1 = CH_3$, $X = CH_2O$, $n = 25$) | commercially available |
| F2 | isopentenyl polyethylene glycol (a molecular weight of 2400, $R_1 = CH_3$, $X = CH_2OCH_2O$, $n = 50$) | commercially available |
| F3 | allyl polyethylene glycol (a molecular weight of 3000, $R_1 = CH_3$, $X = CH_2O$, $n = 65$) | commercially available |
| F4 | vinyl polyethylene glycol (a molecular weight of 4000, $R_1 = H$, $X = O$, $n = 90$) | commercially available |
| F5 | hydroxybutyl vinyl polyethylene glycol (a molecular weight of 3000, $R_1 = H$, $X = O\ CH_2CH_2\ CH_2CH_2O$, $n = 64$) | commercially available |
| O1 | hydrogen peroxide | commercially available |
| O2 | sodium persulfate | commercially available |
| O3 | ammonium persulfate | commercially available |
| O4 | potassium persulfate | commercially available |
| R1 | L-ascorbic acid | commercially available |
| R2 | sodium formaldehyde sulfoxylate | commercially available |
| R3 | ferrous sulfate heptahydrate | commercially available |
| R4 | Sodium bisulfite | commercially available |
| T1 | mercaptopropionic acid | commercially available |
| T2 | mercaptoacetic acid | commercially available |
| T3 | mercaptoethanol | commercially available |

Synthesis Example

Synthesis Examples 1-6 are specific preparation methods of the temperature-sensitive unsaturated macromonomer D. Comparative Synthesis Example 1 and Comparative Synthesis Example 2 are a temperature-sensitive unsaturated macromonomer D with a short polyethylene glycol chain segment (a molecular weight of 600) and a temperature-sensitive unsaturated macromonomer D with a long polyethylene glycol chain segment (a molecular weight of 4000), respectively, and Comparative Synthesis Example 3 and Comparative Synthesis Example 4 are a temperature-sensitive unsaturated macromonomer D with a low lactone and lactam segment content (20%) and a temperature-sensitive unsaturated macromonomer D with a high lactone and lactam chain segment content (70%), respectively. The raw materials, proportions and synthesis conditions are listed in Table 2.

TABLE 2

Reference signs of the raw materials for synthesis examples and comparative examples of the temperature-sensitive unsaturated macromonomer D

| No. | Product | Types of raw materials and their mass ratios | | | Catalyst dosage |
| | | A | B | B/A | (mass ratio) |
|---|---|---|---|---|---|
| Example1 | D1 | A1 | B1 | 45% | 0.20% |
| Example2 | D2 | A3 | B2 | 34% | 0.05% |
| Example3 | D3 | A2 | B3 | 38% | 0.10% |
| Example4 | D4 | A3 | B4 | 39% | 0.10% |
| Example5 | D5 | A2 | B1 | 45% | 0.15% |
| Example6 | D6 | A3 | B1 | 46% | 0.10% |
| Comparative example1 | D7 | A4 | B1 | 40% | 0.10% |
| Comparative example2 | D8 | A5 | B1 | 45% | 0.10% |

TABLE 2-continued

Reference signs of the raw materials for synthesis examples and comparative examples of the temperature-sensitive unsaturated macromonomer D

| No. | Product | Types of raw materials and their mass ratios | | | Catalyst dosage |
|---|---|---|---|---|---|
| | | A | B | B/A | (mass ratio) |
| Comparative example3 | D9 | A3 | B1 | 20% | 0.10% |
| Comparative example4 | D10 | A3 | B1 | 70% | 0.10% |

Synthesis Example 1

100.00 g of A1 and 45.00 g of B1 were added into a glass flask equipped with a thermometer, a stirrer and a nitrogen inlet tube, an operation of introducing nitrogen and vacuumizing was repeated for three times to remove oxygen in the system, and 0.29 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C1.

100.00 g of the intermediate C1 and 13.52 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D1.

Synthesis Example 2

100.00 g of A3 and 34.00 g of B2 were added into a glass flask equipped with a thermometer, a stirrer and a nitrogen inlet tube, an operation of introducing nitrogen and vacuumizing was repeated for three times to remove oxygen in the system, and 0.067 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C2.

100.00 g of the intermediate C2 and 7.31 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D2.

Synthesis Example 3

100.00 g of A2 and 38.00 g of B3 were added into a glass flask equipped with a thermometer, a stirrer and a nitrogen inlet tube, an operation of introducing nitrogen and vacuumizing was repeated for three times to remove oxygen in the system, and 0.138 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C3.

100.00 g of the intermediate C3 and 9.47 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D3.

Synthesis Example 4

100.00 g of A3 and 39.00 g of B4 were added into a glass flask equipped with a thermometer, a stirrer and a nitrogen inlet tube, an operation of introducing nitrogen and vacuumizing was repeated for three times to remove oxygen in the system, and 0.139 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C4.

100.00 g of the intermediate C4 and 7.05 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D4.

Synthesis Example 5

100.00 g of A2 and 45.00 g of B1 were added into a glass flask equipped with a thermometer, a stirrer and a nitrogen inlet tube, an operation of introducing nitrogen and vacuumizing was repeated for three times to remove oxygen in the system, and 0.218 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C5.

100.00 g of the intermediate C5 and 9.01 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D5.

Synthesis Example 6

100.00 g of A3 and 46.00 g of B1 were added into a glass flask equipped with a thermometer, a stirrer and a nitrogen inlet tube, an operation of introducing nitrogen and vacuumizing was repeated for three times to remove oxygen in the system, and 0.146 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C6.

100.00 g of the intermediate C6 and 6.71 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D6.

Comparative Synthesis Example 1

100.00 g of A4 and 40.00 g of B1 were added into a glass flask equipped with a thermometer, a stirrer and a nitrogen inlet tube, an operation of introducing nitrogen and vacuumizing was repeated for three times to remove oxygen in the system, and 0.14 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C7.

100.00 g of the intermediate C7 and 23.33 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D7.

Comparative Synthesis Example 2

100.00 g of A5 and 45.00 g of B1 were added into a glass flask equipped with a thermometer, a stirrer and a nitrogen inlet tube, an operation of introducing nitrogen and vacuumizing was repeated for three times to remove oxygen in the system, and 0.145 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C8.

100.00 g of the intermediate C8 and 3.38 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D8.

Comparative Synthesis Example 3

100.00 g of A3 and 20.00 g of B1 were added into a glass flask equipped with a thermometer, a stirrer and a nitrogen inlet tube, an operation of introducing nitrogen and vacuumizing was repeated for three times to remove oxygen in the system, and 0.12 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C9.

100.00 g of the intermediate C9 and 8.17 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D9.

Comparative Synthesis Example 4

100.00 g of A3 and 70.00 g of B1 were added into a glass flask equipped with a thermometer, a stirrer and a nitrogen inlet tube, an operation of introducing nitrogen and vacuumizing was repeated for three times to remove oxygen in the system, and 0.17 g of stannous octoate was injected as a catalyst; then the flask was put into an oil bath and was heated to 120° C. while stirring, the reaction was carried out while holding the temperature for 24 hours, and then the reactants were cooled to room temperature; after the reaction was completed, the product was dissolved in dichloromethane, purified twice by precipitation with petroleum ether, and vacuum dried for 10 hours to obtain an intermediate product C10.

100.00 g of the intermediate C10 and 5.76 g of maleic anhydride were added into a reaction flask, an operation of introducing nitrogen and vacuumizing was repeated for three times, followed by heating to 80° C. and reaction for 5 hours; after the reaction, the product was dissolved in dichloromethane, purified twice by precipitation with petroleum ether, and vacuum dried for 10 hours to obtain a temperature-sensitive unsaturated macromonomer D10.

Synthesis Examples 7-18 are the specific formulas of the polycarboxylic acid which can dynamically adjust the density of adsorption groups with the ambient temperature, Comparative Example 5 is a comparative polycarboxylic acid water-reducing agent without adding the temperature-sensitive monomer D, Comparative Example 6 and Comparative Example 7 are comparative polycarboxylic acid water-reducing agents synthesized by using the temperature-sensitive unsaturated macromonomers D7 and D8 with short (a molecular weight of 600) and long (a molecular weight of 4000) polyethylene glycol chain segments prepared in Comparative Example 1 and Comparative Example 2, respectively. Comparative Examples 8 and 9 are comparative polycarboxylic acid water-reducing agents synthesized by using temperature-sensitive unsaturated macromonomers D9 and D10 with lower (20%) and higher (70%) lactone and lactam chain segment contents prepared by Comparative Examples 3 and 4, respectively. Comparative Examples 10 and 11 are comparative polycarboxylic acid water-reducing agents prepared by using the temperature-sensitive unsaturated macromonomer D6 prepared in Example 6, but with a low content (2.5%) and a high content (15%), respectively. Except the above synthesis conditions, other synthesis conditions of Comparative Examples 5-11 are the same as those in Example 12. The raw materials, proportions and synthesis conditions used in respective synthesis experimental examples and comparative examples are listed in Table 3.

after the addition was finished, the reaction was carried out while holding the temperature for 1 hour, and the weight concentration was 43.0%.

Synthesis Example 8

240.00 g of F1, 2.47 g of 02 and 300 g of water were put into a glass flask equipped with a thermometer, a stirrer and a nitrogen inlet pipe, heated to 45° C. under the condition of introducing nitrogen, and then dissolved by stirring. A mixed solution containing 47.52 gE1, 16.68 g D2, 0.48 g R2, 2.29 g T1 and 250 g water was added dropwise over 3 hours, and after the addition was finished, the reaction was carried out while holding the temperature for 2 hours, and the weight concentration was 36.0%.

Synthesis Example 9

240.00 g of F2, 0.96 g of 01 and 250 g of water were put into a glass flask equipped with a thermometer, a stirrer and a nitrogen inlet pipe, heated to 40° C. under the condition of introducing nitrogen, and then dissolved by stirring. A mixed solution containing 30.24 g E1, 16.75 g D3, 0.45 g R1, 2.18 g T2 and 200 g water was added dropwise over 5 hours, and after the addition was finished, the reaction was carried out while holding the temperature for 2 hours, and the weight concentration was 39.2%.

TABLE 3

Raw materials, proportions and synthesis conditions used in the experimental examples and comparative examples of synthesis of polycarboxylic acid

| Example | Polyether F | Unsaturated acid E | Acid-ether ratio | Monomer D | D)/(A + B) | Dosage of Oxidant | Dosage of Reductant (F/E) | | Dosage of chain transfer agent | |
|---|---|---|---|---|---|---|---|---|---|---|
| Example 7 | F1 | E1 | 2.5 | D1 | 5.50% | O1 1.50% | R1 | 0.25 | T1 | 0.015 |
| Example 8 | F1 | E1 | 3.3 | D2 | 5.80% | O2 1.20% | R2 | 0.3 | T1 | 0.025 |
| Example 9 | F2 | E1 | 4.2 | D3 | 6.20% | O1 1.60% | R1 | 0.3 | T2 | 0.045 |
| Example 10 | F1 | E2 | 3.5 | D4 | 6.80% | O3 2.00% | R2 | 0.33 | T2 | 0.028 |
| Example 11 | F2 | E3 | 4.9 | D5 | 7.50% | O4 2.50% | R3 | 0.25 | T3 | 0.036 |
| Example 12 | F2 | E1 | 4.5 | D6 | 7.50% | O1 4.00% | R1 | 0.25 | T1 | 0.032 |
| Example 13 | F3 | E3 | 6.8 | D1 | 8.80% | O3 1.50% | R4 | 0.33 | T1 | 0.015 |
| Example 14 | F4 | E1 | 8.5 | D1 | 9.50% | O2 2.80% | R2 | 0.45 | T3 | 0.035 |
| Example 15 | F2 | E1 | 5.5 | D5 | 6.50% | O1 3.60% | R1 | 0.45 | T2 | 0.03 |
| Example 16 | F5 | E1 | 6.5 | D5 | 7.90% | O4 4.50% | R4 | 0.4 | T1 | 0.03 |
| Example 17 | F5 | E2 | 6.5 | D6 | 6.50% | O1 4.00% | R1 | 0.4 | T3 | 0.03 |
| Example 18 | F5 | E3 | 6.5 | D6 | 7.50% | O1 2.00% | R1 | 0.33 | T3 | 0.03 |
| Comparative example 5 | F2 | E1 | 4.5 | — | — | O1 4.00% | R1 | 0.25 | T1 | 0.032 |
| Comparative example 6 | F2 | E1 | 4.5 | D7 | 7.50% | O1 4.00% | R1 | 0.25 | T1 | 0.032 |
| Comparative example 7 | F2 | E1 | 4.5 | D8 | 7.50% | O1 4.00% | R1 | 0.25 | T1 | 0.032 |
| Comparative example 8 | F2 | E1 | 4.5 | D9 | 7.50% | O1 4.00% | R1 | 0.25 | T1 | 0.032 |
| Comparative example 9 | F2 | E1 | 4.5 | D10 | 7.50% | O1 4.00% | R1 | 0.25 | T1 | 0.032 |
| Comparative example 10 | F2 | E1 | 4.5 | D6 | 2.50% | O1 4.00% | R1 | 0.25 | T1 | 0.032 |
| Comparative example 11 | F2 | E1 | 4.5 | D6 | 15.00% | O1 4.00% | R1 | 0.25 | T1 | 0.032 |

Synthesis Example 7

240.00 g of F1, 1.21 g of 01 and 240 g of water were put into a glass flask equipped with a thermometer, a stirrer and a nitrogen inlet pipe, heated to 35° C. under the condition of introducing nitrogen, and then dissolved by stirring. A mixed solution containing 36.00 g E1, 15.18 g D1, 0.47 g R1, 1.13 g T1 and 150 g water was added dropwise over 4 hours, and Synthesis Example 10

240.00 g of F1, 4.14 g of 03 and 200 g of water were put into a glass flask equipped with a thermometer, a stirrer and a nitrogen inlet pipe, heated to 45° C. under the condition of introducing nitrogen, and then dissolved by stirring. A mixed solution containing 60.20 g E2, 20.41 g D4, 0.92 g R2, 2.34 g T2 and 120 g water was added dropwise over 3 hours, and after the addition was finished, the reaction was carried out while holding the temperature for 2 hours, and the weight concentration was 50.6%.

Synthesis Example 11

240.00 g of F2, 4.05 g of O4 and 200 g of water were put into a glass flask equipped with a thermometer, a stirrer and a nitrogen inlet pipe, heated to 55° C. under the condition of introducing nitrogen, and then dissolved by stirring. A mixed solution containing 56.84 g E3, 22.26 g D5, 1.04 g R3, 1.68 g T3 and 100 g water was added dropwise over 2 hours, and after the addition was finished, the reaction was carried out while holding the temperature for 3 hours, and the weight concentration was 52.1%.

Synthesis Example 12

240.00 g of F2, 2.52 g of O1 and 240 g of water were put into a glass flask equipped with a thermometer, a stirrer and a nitrogen inlet pipe, heated to 45° C. under the condition of introducing nitrogen, and then dissolved by stirring. A mixed solution containing 32.40 g E1, 20.43 g D6, 0.98 g R1, 1.89 g T1 and 150 g water was added dropwise over 3 hours, and after the addition was finished, the reaction was carried out while holding the temperature for 2 hours, and the weight concentration was 43.3%.

Synthesis Example 13

240.00 g of F3, 2.19 g of O3 and 200 g of water were put into a glass flask equipped with a thermometer, a stirrer and a nitrogen inlet pipe, heated to 45° C. under the condition of introducing nitrogen, and then dissolved by stirring. A mixed solution containing 63.10 g E3, 26.67 g D1, 0.33 g R4, 1.02 g T1 and 100 g water was added dropwise over 4 hours, and after the addition was finished, the reaction was carried out while holding the temperature for 1 hour, and the weight concentration was 52.6%.

Synthesis Example 14

240.00 g of F4, 3.91 g of O2 and 220 g of water were put into a glass flask equipped with a thermometer, a stirrer and a nitrogen inlet pipe, heated to 45° C. under the condition of introducing nitrogen, and then dissolved by stirring. A mixed solution containing 36.72 g E1, 26.29 g D1, 1.14 g R2, 1.60 g T3 and 120 g water was added dropwise over 2 hours, and after the addition was finished, the reaction was carried out while holding the temperature for 3 hours, and the weight concentration was 47.7%.

Synthesis Example 15

240.00 g of F2, 2.68 g of O1 and 250 g of water were put into a glass flask equipped with a thermometer, a stirrer and a nitrogen inlet pipe, heated to 45° C. under the condition of introducing nitrogen, and then dissolved by stirring. A mixed solution containing 39.60 g E1, 18.17 g D5, 1.88 g R1, 1.82 g T2 and 130 g water was added dropwise over 3 hours, and after the addition was finished, the reaction was carried out while holding the temperature for 2 hours, and the weight concentration was 44.5%.

Synthesis Example 16

240.00 g of F5, 7.41 g of O4 and 280 g of water were put into a glass flask equipped with a thermometer, a stirrer and a nitrogen inlet pipe, heated to 40° C. under the condition of introducing nitrogen, and then dissolved by stirring. A mixed solution containing 37.44 g E1, 21.92 g D5, 1.14 g R4, 1.94 g T1 and 160 g water was added dropwise over 3 hours, and after the addition was finished, the reaction was carried out while holding the temperature for 2 hours, and the weight concentration was 41.3%.

Synthesis Example 17

240.00 g of F5, 2.75 g of O1 and 240 g of water were put into a glass flask equipped with a thermometer, a stirrer and a nitrogen inlet pipe, heated to 40° C. under the condition of introducing nitrogen, and then dissolved by stirring. A mixed solution containing 44.72 g E2, 18.51 g D6, 1.71 g R1, 1.42 g T3 and 150 g water was added dropwise over 3 hours, and after the addition was finished, the reaction was carried out while holding the temperature for 2 hours, and the weight concentration was 44.2%.

Synthesis Example 18

240.00 g of F5, 1.38 g of O1 and 240 g of water were put into a glass flask equipped with a thermometer, a stirrer and a nitrogen inlet pipe, heated to 40° C. under the condition of introducing nitrogen, and then dissolved by stirring. A mixed solution containing 60.32 g E3, 22.52 g D6, 0.71 g R1, 1.42 g T3 and 150 g water was added dropwise over 3 hours, and after the addition was finished, the reaction was carried out while holding the temperature for 2 hours, and the weight concentration was 45.6%.

Comparative Synthesis Example 5

240.00 g of F2, 2.49 g of O1 and 240 g of water were put into a glass flask equipped with a thermometer, a stirrer and a nitrogen inlet pipe, heated to 45° C. under the condition of introducing nitrogen, and then dissolved by stirring. A mixed solution containing 32.40 g E1, 0.97 g R1, 1.87 g T1 and 150 g water was added dropwise over 3 hours, and after the addition was finished, the reaction was carried out while holding the temperature for 2 hours, and the weight concentration was 41.6%.

Comparative Synthesis Example 6

240.00 g of F2, 2.58 g of O1 and 240 g of water were put into a glass flask equipped with a thermometer, a stirrer and a nitrogen inlet pipe, heated to 45° C. under the condition of introducing nitrogen, and then dissolved by stirring. A mixed solution containing 32.40 g E1, 20.43 g D7, 1.00 g R1, 1.93 g T and 150 g water was added dropwise over 3 hours, and after the addition was finished, the reaction was carried out while holding the temperature for 2 hours, and the weight concentration was 43.3%.

Comparative Synthesis Example 7

240.00 g of F2, 2.51 g of O1 and 240 g of water were put into a glass flask equipped with a thermometer, a stirrer and a nitrogen inlet pipe, heated to 45° C. under the condition of introducing nitrogen, and then dissolved by stirring. A mixed solution containing 32.40 g E1, 20.43 g D8, 0.97 g R1, 1.88 g T1 and 150 g water was added dropwise over 3 hours, and after the addition was finished, the reaction was carried out while holding the temperature for 2 hours, and the weight concentration was 43.3%.

Comparative Synthesis Example 8

240.00 g of F2, 2.53 g of O1 and 240 g of water were put into a glass flask equipped with a thermometer, a stirrer and a nitrogen inlet pipe, heated to 45° C. under the condition of introducing nitrogen, and then dissolved by stirring. A mixed solution containing 32.40 g E1, 20.43 g D9, 0.98 g R1, 1.89 g T1 and 150 g water was added dropwise over 3 hours, and after the addition was finished, the reaction was carried out while holding the temperature for 2 hours, and the weight concentration was 43.3%.

Comparative Synthesis Example 9

240.00 g of F2, 2.52 g of O1 and 240 g of water were put into a glass flask equipped with a thermometer, a stirrer and a nitrogen inlet pipe, heated to 45° C. under the condition of introducing nitrogen, and then dissolved by stirring. A mixed solution containing 32.40 g E1, 20.43 g D10, 0.98 g R1, 1.88 g T1 and 150 g water was added dropwise over 3 hours, and after the addition was finished, the reaction was carried out while holding the temperature for 2 hours, and the weight concentration was 43.3%.

Comparative Synthesis Example 10

240.00 g of F2, 2.50 g of O1 and 240 g of water were put into a glass flask equipped with a thermometer, a stirrer and a nitrogen inlet pipe, heated to 45° C. under the condition of introducing nitrogen, and then dissolved by stirring. A mixed solution containing 32.40 g E1, 6.81 g D6, 0.97 g R1, 1.87 g T1 and 150 g water was added dropwise over 3 hours, and after the addition was finished, the reaction was carried out while holding the temperature for 2 hours, and the weight concentration was 42.3%.

Comparative Synthesis Example 11

240.00 g of F2, 2.55 g of O1 and 240 g of water were put into a glass flask equipped with a thermometer, a stirrer and a nitrogen inlet pipe, heated to 45° C. under the condition of introducing nitrogen, and then dissolved by stirring. A mixed solution containing 32.40 g E1, 40.86 g D6, 0.99 g R1, 1.87 g T1 and 150 g water was added dropwise over 3 hours, and after the addition was finished, the reaction was carried out while holding the temperature for 2 hours, and the weight concentration was 45.0%.

APPLICATION EXAMPLES

Application Example 1

In this example of the present invention, the molecular weight and conversion rate of all polymers were determined by Agilent GPC1260, and the experimental conditions are as follows:
Gel column: three series-connected chromatographic columns, i.e., protection columns TSKguard Column PWXL+TSKgel G3000PWXL+a mixed bed column TSKgel GMPWXL
Mobile phase: 0.1 M NaNO3 solution
Mobile phase velocity: 1 ml/min
Injection: 20 µl 0.5% aqueous solution
Detector: an Agilent differential refractive index detector
Standard substance: a polyethylene glycol GPC standard sample (Sigma-Aldrich, molecular weights of 1010000, 478000, 263000, 118000, 44700, 18600, 6690, 1960, 628, 232)

According to the GB/T8077-2012 standard, of the water-reducing agent prepared by the present invention was tested for the cement paste fluidity. 300 g of Onoda P II 52.5 cement, 87 g of water, and the water-reducing agent for each example with a 0.12% dosage were stirred slowly for 2 minutes and then stirred quickly for 2 minutes; the fluidity of the cement paste was measured on a flat glass, the fluidity of cement paste after 30 minutes and 1 hour was tested, and the ambient temperature during the test was 20° C.

The molecular weights and conversion rates of all examples and comparative examples are shown in the following table.

TABLE 4

Molecular weight and conversion rate of polycarboxylic acid synthesis examples and comparative examples

| No. | $Mn/10^3$ | $Mw/10^3$ | PDI | Conversion rate (%) | Fluidity (mm) | | |
|---|---|---|---|---|---|---|---|
| | | | | | 4 min | 30 min | 60 min |
| Example 7 | 22.7 | 40.2 | 1.77 | 89.8 | 228 | 208 | 191 |
| Example 8 | 20.3 | 30.5 | 1.5 | 91.4 | 232 | 210 | 190 |
| Example 9 | 18 | 28.6 | 1.59 | 92.9 | 234 | 212 | 196 |
| Example 10 | 15.9 | 26.7 | 1.68 | 90.7 | 235 | 212 | 192 |
| Example 11 | 18.5 | 30.0 | 1.62 | 91 | 229 | 208 | 192 |
| Example 12 | 31 | 50.2 | 1.62 | 89.2 | 237 | 210 | 190 |
| Example 13 | 35.3 | 55.4 | 1.57 | 91.6 | 231 | 202 | 183 |
| Example 14 | 30.5 | 50.3 | 1.65 | 90.7 | 227 | 205 | 190 |
| Example 15 | 24.4 | 41.5 | 1.7 | 90.1 | 223 | 199 | 184 |
| Example 16 | 20.6 | 36.9 | 1.79 | 92.5 | 223 | 193 | 173 |
| Example 17 | 43.6 | 77.2 | 1.77 | 89.7 | 225 | 204 | 189 |
| Example 18 | 27.6 | 48.3 | 1.75 | 90 | 225 | 204 | 184 |
| Comparative Example 5 | 29.6 | 50.9 | 1.72 | 91.1 | 242 | 220 | 200 |
| Comparative Example 6 | 29.3 | 47.8 | 1.63 | 89 | 173 | 143 | 128 |
| Comparative Example 7 | 29.7 | 48.1 | 1.62 | 90.6 | 246 | 217 | 199 |
| Comparative Example 8 | 28.2 | 47.1 | 1.67 | 92.8 | 242 | 222 | 202 |

TABLE 4-continued

Molecular weight and conversion rate of polycarboxylic acid synthesis examples and comparative examples

| No. | Mn/10³ | Mw/10³ | PDI | Conversion rate (%) | Fluidity (mm) 4 min | 30 min | 60 min |
|---|---|---|---|---|---|---|---|
| Comparative Example 9 | 23.6 | 40.3 | 1.71 | 87.4 | 170 | 143 | 126 |
| Comparative Example 10 | 29.3 | 49.5 | 1.69 | 90 | 245 | 225 | 210 |
| Comparative Example 11 | 28.8 | 46.7 | 1.62 | 90.5 | 168 | 140 | 121 |

It can be seen from the above table that the introduction of the polymerizable temperature-sensitive monomer D has no adverse effect on the conversion rate of polymerization reaction, a conversion rate of about 90% can be reached for all of them, and the molecular weight is basically controlled at 20,000-800,000, which does not differ significantly from that of the Comparative Example 1 without adding the temperature-sensitive monomer D. From the point of view of the paste fluidity at room temperature, there is no significant difference in terms of the initial dispersing capability and the later dispersion retention capability, which demontstrates that the addition of the monomer D has no effect on the performance of the polycarboxylic acid water-reducing agent at room temperature.

Comparative Examples 6 and 7 are comparative polycarboxylic acid water-reducing agents synthesized by using temperature-sensitive unsaturated macromonomers D7 and D8 with short (a molecular weight of 600) and long (a molecular weight of 4000) polyethylene glycol chain segments prepared in Comparative Examples 1 and 2, respectively. From the point of view of their influence on polymerization reaction, the length of the polyethylene glycol chain segment has no effect, but from the point of view of dispersing capability at room temperature, the short polyethylene glycol chain segment has adverse effect on this, while the long polyethylene glycol chain segment has little effect.

Comparative Examples 8 and 9 are comparative polycarboxylic acid water-reducing agents synthesized by using the temperature-sensitive unsaturated macromonomers D9 and D10 with lower (20%) and higher (70%) contents of lactone and lactam chain segments prepared by Comparative Examples 3 and 4, respectively. When the content of lactone and lactam chain segment is low, it has no significant effect on polymerization reaction and dispersing capability at room temperature, while a high content will cause a slight decrease in molecular weight and conversion rate, and will deteriorate the dispersing capability at room temperature.

Comparative Examples 10 and 11 are comparative polycarboxylic acid water-reducing agents prepared by using the temperature-sensitive unsaturated macromonomer D6 prepared in Example 6, but with a low content (2.5%) and a high content (15%), respectively. When the content of D6 is low, it has no significant effect on polymerization reaction and dispersing capability at room temperature, and when the content is high, it has no significant effect on conversion rate of polymerization reaction, but it has an effect on initial dispersing capability at room temperature.

Application Example 2

The actual exposed charge density (calculated based on a mass fraction of carboxyl, %) of the polycarboxylic acid water-reducing agents prepared in the Examples and Comparative Examples at different temperatures was determined by potentiometric titration. The specific method is as follows: about 1.0-1.5 g (based on a solid) of the sample was diluted to 100 mL with water, and the pH of the diluted solution was adjusted to 11.50 with 0.385 mol/L NaOH solution under the monitoring of a pH meter. Conductivity titration was carried out with 0.0242 mol/L sulfuric acid solution under magnetic stirring, and the recorded conductivity value and the volume of the sulfuric acid solution were plotted as a ρ-$H_2SO_4$ volume curve. Two abrupt points can be observed from the curve, and the volumes of $H_2SO_4$ corresponding to the two abrupt points are $V_1$ and $V_2$. The mass fraction of carboxylate radicals was calculated by the following formula:

$$X(COOH) = \frac{(V_2 - V_1) * C(H_2SO_4) * 2 * 44.01}{m_0}$$

$C(H_2SO_4)$—calibrated concentration of the sulfuric acid solution, in mol/L;
$m_0$—the mass of the tested sample, in g;

TABLE 5

Charge density of polycarboxylic acid synthesis examples and comparative examples at different temperatures

| No. | Charge density (%) 5° C. | 10° C. | 20° C. | 30° C. | 40° C. | 50° C. |
|---|---|---|---|---|---|---|
| Example 7 | 9.7 | 9.6 | 8.7 | 8 | 7.5 | 7.3 |
| Example 8 | 9.3 | 8.9 | 8.4 | 7.4 | 6.6 | 6.3 |
| Example 9 | 9.9 | 9.8 | 9.3 | 8.4 | 7.8 | 7.6 |
| Example 10 | 8.3 | 8.1 | 7.4 | 6.9 | 6.3 | 6.2 |
| Example 11 | 9.3 | 8.8 | 7.8 | 6.8 | 6.3 | 6 |
| Example 12 | 9.8 | 9.6 | 8.6 | 8 | 7.2 | 6.9 |
| Example 13 | 9.3 | 9.2 | 8.4 | 7.5 | 6.7 | 6.5 |
| Example 14 | 9.7 | 9.4 | 8.4 | 7.5 | 7 | 6.9 |
| Example 15 | 9.2 | 8.8 | 8.3 | 7.4 | 6.9 | 6.7 |
| Example 16 | 8.4 | 8 | 7.2 | 6.4 | 5.4 | 5 |
| Example 17 | 9.6 | 9.1 | 8.2 | 7.5 | 6.5 | 6.2 |
| Example 18 | 8.8 | 8.6 | 7.7 | 7.1 | 6.4 | 6 |
| Comparative Example 5 | 8.4 | 8.5 | 8.3 | 8.5 | 8 | 8.1 |
| Comparative Example 6 | 7.9 | 8 | 7.9 | 7.6 | 8 | 8.3 |
| Comparative Example 7 | 7.6 | 8.1 | 7.8 | 7.6 | 7.6 | 7.9 |
| Comparative Example 8 | 7.9 | 8.2 | 8.2 | 8.5 | 7.9 | 8 |
| Comparative Example 9 | 7.5 | 6.5 | 5.8 | 5.3 | 4.4 | 4.3 |
| Comparative Example 10 | 8.1 | 8.5 | 8.3 | 8.4 | 8.2 | 8.5 |

TABLE 5-continued

Charge density of polycarboxylic acid synthesis examples
and comparative examples at different temperatures

| | Charge density (%) | | | | | |
|---|---|---|---|---|---|---|
| No. | 5° C. | 10° C. | 20° C. | 30° C. | 40° C. | 50° C. |
| Comparative Example 11 | 8 | 6.7 | 5.2 | 4.5 | 3.6 | 3.2 |

It can be seen from the above table that after the introduction of the temperature-sensitive monomer D, the charge density is about 10% at a low temperature (5-10° C.), gradually decreases to about 8% at 20-30° C., and is only about 7% when the temperature further rises to 40-50° C., which indicates that the charge density (adsorption group density) of the polycarboxylic acid water-reducing agent can dynamically change with the ambient temperature. Comparative Example 5 differs from Example 6 in that Comparative Example 5 has no temperature-sensitive monomer D. It can be seen that the charge density (adsorption group density) of this conventional water-reducing agent has little difference at different temperatures, and is about 8.5%, indicating that its charge density is insensitive to the ambient temperature and cannot change with the ambient temperature.

When the ethylene glycol chain segment in the temperature-sensitive monomer D is excessively short (a molecular weight of 600) or excessively long (a molecular weight of 4000) (Comparative Example 6 and Comparative Example 7, respectively), there is also the phenomenon that the charge density is insensitive to the ambient temperature.

Comparative examples 8 and 9 are comparative polycarboxylic acid water-reducing agents synthesized by using the temperature-sensitive unsaturated macromonomers D9 and D10 with excessively low (20%) and excessively high (70%) contents of lactone and lactam chain segments prepared in Comparative Examples 3 and 4, respectively. When the content of lactone and lactam chain segments is excessively low, there is no significant difference in the charge density (adsorption group density), which is about 8.1%, indicating that the charge density is insensitive to ambient temperature; when the content of lactone and lactam segments is excessively high, the charge density can dynamically change with the ambient temperature, but is generally lower than that of the samples in the examples.

Comparative Examples 10 and 11 are comparative polycarboxylic acid water-reducing agents prepared by using temperature-sensitive unsaturated macromonomer D6 prepared in Example 6, but with an excessively low content (2.5%) and an excessively high content (15%), respectively. When the content of D6 is excessively low, the charge density (adsorption group density) of the synthesized polycarboxylic acid water-reducing agent has little difference at different ambient temperatures, and is about 8.5%, indicating that the charge density is insensitive to the ambient temperature. When the content of D6 is excessively high, the charge density of the synthesized polycarboxylic acid water-reducing agent can dynamically change with the ambient temperature, but is generally significantly lower than that of the samples in the examples.

Application Example 3

The adsorption rates of the polycarboxylic acid water-reducing agents prepared in the Examples and Comparative Examples at different temperatures were tested by using a total organic carbon analyzer with the following specific method: 100 g of cement, 100 g of deionized water and 0.12 g of the water-reducing agent (based on a solid) were respectively weighed and put in a beaker, a magneton was added, magnetic stirring was started, the beaker was placed in water baths at different temperatures, and samples were taken at different time points (4 minutes and 60 minutes) and centrifuged to obtain supernatants; the total organic carbon analyzer was used to measure the carbon content, which was then compared with the blank sample, and the actual adsorption rate was obtained by a subtraction method.

TABLE 6

Adsorption rates of polycarboxylic acid synthesis examples and
comparative examples at different temperatures

| | Adsorption rate (%) | | | | | | | | | | | |
|---|---|---|---|---|---|---|---|---|---|---|---|---|
| | 4 min | | | | | | 60 min | | | | | |
| No. | 5° C. | 10° C. | 20° C. | 30° C. | 40° C. | 50° C. | 5° C. | 10° C. | 20° C. | 30° C. | 40° C. | 50° C. |
| Example 7 | 22.1 | 24.9 | 23.9 | 30 | 31.6 | 35.9 | 45.4 | 50.5 | 49.7 | 57.8 | 60.3 | 62.7 |
| Example 8 | 24.7 | 22.5 | 26 | 29 | 35.7 | 36.4 | 44.8 | 46.4 | 52.8 | 57.8 | 61.6 | 65.4 |
| Example 9 | 22.6 | 23.3 | 26.4 | 30.6 | 32.2 | 37 | 48.1 | 47.7 | 52.4 | 60 | 60.8 | 61 |
| Example 10 | 24.9 | 25.7 | 24.5 | 27.1 | 33.8 | 37.9 | 44.2 | 48.9 | 49.5 | 58.4 | 59.8 | 65.3 |
| Example 11 | 23.2 | 27 | 28.1 | 30 | 32.8 | 36.5 | 43.6 | 48.2 | 51.8 | 59.5 | 62.4 | 63.5 |
| Example 12 | 22.8 | 24.3 | 26.5 | 29.7 | 34.5 | 36.7 | 45.7 | 48.5 | 52.5 | 57.1 | 60.5 | 62.9 |
| Example 13 | 23.3 | 26.2 | 27.6 | 32.7 | 32.6 | 36 | 45.4 | 48.7 | 53.4 | 54.4 | 59.4 | 61.1 |
| Example 14 | 21.9 | 22.3 | 24.8 | 29.4 | 33.8 | 36.4 | 44.5 | 49.9 | 54.9 | 57.3 | 63.5 | 60.7 |
| Example 15 | 23.7 | 22.2 | 28.5 | 32.2 | 34.5 | 38.7 | 46.6 | 49.5 | 52.8 | 56.4 | 58.8 | 63.1 |
| Example 16 | 20 | 27.3 | 27.9 | 28.6 | 34.3 | 38.2 | 46.2 | 51.2 | 50.2 | 60 | 59.3 | 62.5 |
| Example 17 | 25.1 | 23.4 | 24 | 26.9 | 34.2 | 39.2 | 48.1 | 50 | 55.1 | 57.3 | 62.2 | 63.1 |
| Example 18 | 25.7 | 24.3 | 27.3 | 31.3 | 35.7 | 36.7 | 44.5 | 46.7 | 55.3 | 56.7 | 57.9 | 65.3 |
| Comparative Example 5 | 13.3 | 20.5 | 35.3 | 37.9 | 45.5 | 55.8 | 39.8 | 45.9 | 55.5 | 58.5 | 60.2 | 60.8 |
| Comparative Example 6 | 10.9 | 15.5 | 20.7 | 32.5 | 39.5 | 43.2 | 33.8 | 35.5 | 45.5 | 48.8 | 50.6 | 51.1 |
| Comparative Example 7 | 14.5 | 21.4 | 35.6 | 42.5 | 49.9 | 57.3 | 40.7 | 48.1 | 55.2 | 63.1 | 62 | 65 |

TABLE 6-continued

Adsorption rates of polycarboxylic acid synthesis examples and comparative examples at different temperatures

| | Adsorption rate (%) | | | | | | | | | | | |
|---|---|---|---|---|---|---|---|---|---|---|---|---|
| | 4 min | | | | | | 60 min | | | | | |
| No. | 5° C. | 10° C. | 20° C. | 30° C. | 40° C. | 50° C. | 5° C. | 10° C. | 20° C. | 30° C. | 40° C. | 50° C. |
| Comparative Example 8 | 9 | 15.6 | 33 | 37.8 | 42.2 | 50.9 | 35 | 41.1 | 54.5 | 55.7 | 58.7 | 56.9 |
| Comparative Example 9 | 20.9 | 26.5 | 28.5 | 25.5 | 18.5 | 15.4 | 40.5 | 46.7 | 48.9 | 50.2 | 41.3 | 38.3 |
| Comparative Example 10 | 13.7 | 18.7 | 37.2 | 39.1 | 45.1 | 56.7 | 41.3 | 47.1 | 56.6 | 58.6 | 58.4 | 59.8 |
| Comparative Example 11 | 18.7 | 27.8 | 33.9 | 33.5 | 22.7 | 18.9 | 44.5 | 47.9 | 52.1 | 56.7 | 45.5 | 42.9 |

It can be seen from the above table that after the introduction of the temperature-sensitive monomer D, the adsorption rate is about 25% at a low temperature (5-10° C.), slightly increases to about 30% at 20-30° C., and finally reaches about 35% when the temperature further increases to 40-50° C. However, Comparative example 5 differs from Example 6 in that Comparative example 5 has no temperature-sensitive monomer D. It can be seen that the adsorption rate of this conventional water-reducing agent is only 13% at a low temperature (5-10° C.), and finally, the adsorption rate is about 55% at 40-50° C. The above two groups of data fully demonstrate that the adsorption rate of the polycarboxylic acid water-reducing agent prepared by the present invention only changes by about 10% when the ambient temperature changes from 5° C. to 50° C., while the adsorption rate of the conventional water-reducing agent without the temperature-sensitive monomer D changes by more than 40% when the ambient temperature changes from 5° C. to 50° C. Therefore, the polycarboxylic acid water-reducing agent prepared by the present invention can dynamically adjust the adsorption group density with the ambient temperature, thereby compensating for the influence of the ambient temperature on the adsorption behavior, so that the adsorption behavior of the water-reducing agent does not change too much at any ambient temperature.

In addition, the excessively short (a molecular weight of 600) and excessively long (a molecular weight of 4000) ethylene glycol chain segments in the temperature-sensitive monomer D (Comparative Example 6 and Comparative Example 7, respectively), the excessively low content of lactone and lactam chain segments (20%, Comparative Example 8), and the excessively low content of the temperature-sensitive unsaturated macromonomer D6 (2.5%, Comparative Example 10) will all lead to a great difference in the adsorption rate with the change of the ambient temperature.

The adsorption rate with an excessively high content of lactone and lactam chain segment (70%, Comparative Example 9) and the temperature-sensitive unsaturated macromonomer D6 with an excessively high content (25%, Comparative Example 11) at a low temperature do not differ significantly from that of the polycarboxylic acid water-reducing agent of the present invention, but the adsorption levels thereof at a normal temperature and a high temperature are excessively low, which will affect the initial dispersing capability at the normal temperature and high temperature.

Application Example 4

In order to compare the dispersing performance and dispersion retention performance of the polycarboxylic acid water-reducing agents prepared by the present invention at different temperatures, the fluidity test of the cement paste was carried out with reference to GB/T8077-2012 standard. The cement was 300 g, 87 g water added was, and the solid dosage of the water-reducing agent was 0.12% unless otherwise specified (Comparative Example 12 adopted the same polycarboxylic acid water-reducing agent as Comparative Example 5, but the dosage of the water-reducing agent was increased to 0.15%; Comparative example 13 adopted the same polycarboxylic acid water-reducing agent as Comparative example 5, but the dosage was reduced to 0.10%); after stirring for 4 minutes, the fluidity of cement paste was measured on a flat glass, and the fluidity of the cement paste after different times was tested. The experimental results are shown in Table 6. All experimental materials were kept at a constant temperature overnight in a refrigerator or an oven to a set temperature, and the prepared cement paste was placed in an ice water bath or a curing box to maintain the set temperature.

TABLE 7

Dispersing and dispersion retention performance of the cement with polycarboxylic acid synthesis examples and comparative examples at different temperatures

| | Paste fluidity (mm) | | | | | | | | | | | |
|---|---|---|---|---|---|---|---|---|---|---|---|---|
| | 4 min | | | | | | 60 min | | | | | |
| No. | 5° C. | 10° C. | 20° C. | 30° C. | 40° C. | 50° C. | 5° C. | 10° C. | 20° C. | 30° C. | 40° C. | 50° C. |
| Example 7 | 196 | 212 | 227 | 239 | 251 | 258 | 207 | 203 | 185 | 183 | 185 | 176 |
| Example 8 | 205 | 220 | 237 | 244 | 252 | 260 | 214 | 230 | 197 | 174 | 191 | 177 |

TABLE 7-continued

Dispersing and dispersion retention performance of the cement with polycarboxylic acid synthesis examples and comparative examples at different temperatures

| | Paste fluidity (mm) | | | | | | | | | | | |
|---|---|---|---|---|---|---|---|---|---|---|---|---|
| | 4 min | | | | | | 60 min | | | | | |
| No. | 5° C. | 10° C. | 20° C. | 30° C. | 40° C. | 50° C. | 5° C. | 10° C. | 20° C. | 30° C. | 40° C. | 50° C. |
| Example 9 | 193 | 209 | 225 | 234 | 241 | 248 | 210 | 228 | 190 | 177 | 172 | 161 |
| Example 10 | 188 | 206 | 221 | 231 | 242 | 248 | 207 | 218 | 174 | 169 | 179 | 159 |
| Example 11 | 192 | 208 | 224 | 234 | 242 | 251 | 195 | 228 | 185 | 170 | 174 | 167 |
| Example 12 | 207 | 224 | 239 | 249 | 260 | 266 | 215 | 239 | 194 | 182 | 200 | 177 |
| Example 13 | 189 | 208 | 224 | 232 | 240 | 249 | 198 | 215 | 181 | 167 | 173 | 161 |
| Example 14 | 196 | 211 | 230 | 242 | 250 | 257 | 207 | 209 | 191 | 185 | 187 | 169 |
| Example 15 | 206 | 226 | 245 | 257 | 264 | 271 | 224 | 223 | 198 | 204 | 199 | 188 |
| Example 16 | 193 | 213 | 231 | 240 | 252 | 258 | 199 | 225 | 191 | 181 | 190 | 175 |
| Example 17 | 195 | 213 | 231 | 239 | 247 | 253 | 196 | 209 | 184 | 173 | 185 | 167 |
| Example 18 | 193 | 212 | 232 | 242 | 250 | 259 | 196 | 220 | 195 | 188 | 183 | 174 |
| Comparative Example 5 | 111 | 179 | 246 | 299 | 320 | 320 | 260 | 299 | 205 | 207 | 134 | 120 |
| Comparative Example 6 | 132 | 149 | 164 | 172 | 183 | 193 | 151 | 165 | 124 | 188 | 206 | 225 |
| Comparative Example 7 | 121 | 186 | 247 | 301 | 320 | 320 | 257 | 286 | 204 | 206 | 129 | 130 |
| Comparative Example 8 | 123 | 185 | 246 | 302 | 320 | 320 | 267 | 291 | 199 | 202 | 128 | 133 |
| Comparative Example 9 | 146 | 165 | 181 | 188 | 196 | 206 | 151 | 167 | 133 | 178 | 200 | 188 |
| Comparative Example 10 | 112 | 176 | 234 | 286 | 320 | 320 | 248 | 294 | 191 | 186 | 124 | 124 |
| Comparative Example 11 | 114 | 130 | 145 | 153 | 161 | 166 | 126 | 138 | 106 | 195 | 206 | 193 |
| Comparative Example 12 | 203 | 224 | — | — | — | — | 320 | 320 | — | — | — | — |
| Comparative Example 13 | — | — | — | — | 265 | 278 | — | — | — | — | 110 | 90 |

It can be seen from the above table that the initial fluidity of the cement paste is about 200 mm at a low temperature (5-10° C.) after the introduction of the temperature-sensitive monomer D, and is about 230 mm when the temperature gradually increases to 20-30° C., and the four-minute fluidity of the cement paste is about 250 mm when the temperature further rises to 40-50° C. It can be seen that with the increase of the temperature, the fluidity of the cement paste does not change significantly, which shows that the polycarboxylic acid water-reducing agent of the present invention has good adaptability to the ambient temperature.

Comparative example 5 differs from Example 6 in that Comparative example 5 has no temperature-sensitive monomer D. It can be seen that the initial fluidity of the conventional water-reducing agent is only about 110 mm at a low temperature (5-10° C.), but exceeds 300 mm at 40-50° C., and the phenomenon of segregation and bleeding has appeared. It can be seen that the dispersing efficacy of the conventional water-reducing agent without the temperature-sensitive monomer D is greatly affected by the ambient temperature. In order to avoid too weak initial dispersing capability at a low temperature, a general measure is to increase the dosage of the water-reducing agent (Comparative Example 12), in which case the initial fluidity can be shown, but due to continuous adsorption, the excess fluidity in the later period will lead to the fluidity exceeding 300 mm after 60 minutes, resulting in segregation and bleeding, which seriously affects the mechanical properties and durability of the concrete and causes huge losses to the engineering quality. In order to avoid too strong initial dispersing capability at a high temperature, a general measure is to reduce the dosage of the water-reducing agent (Comparative Example 13), in which case the initial fluidity is equivalent to that at a normal temperature, but the failure of continuous adsorption to supplement the later fluidity will lead to the loss of fluidity after 60 minutes, which will cause serious difficulties for concrete pumping and construction.

When the total amount of the temperature-sensitive monomer is too low (2%, Comparative Example 2), it can still be seen that its dispersing capability is greatly affected by the ambient temperature; however, when the total amount of the temperature-sensitive monomer is too high (25%, Comparative Example 3), although the dispersion capability is not significantly affected by the ambient temperature, the overall dispersing capability of the water-reducing agent at different temperatures is weak, which is mainly due to the low adsorption level caused by its low charge density.

When the content of C in the two temperature-sensitive monomers is excessively low (C/D=0.5, Comparative Example 4), the initial dispersing capability of the polycarboxylic acid water-reducing agent changes significantly at a high temperature, and the later dispersion retention capability is weak, demonstrating that its dispersing capability has good adaptability to low temperatures, but is sensitive to a high temperature environment. When the content of C in the two temperature-sensitive monomers is excessively high (C/D=5, Comparative Example 5), the initial dispersing capability of the polycarboxylic acid water-reducing agent at a low temperature is significantly undesirable, and there is an obvious increase phenomenon at 30 minutes, which shows that its dispersing capability has good adaptability to high temperatures, but is sensitive to a low temperature environment. Therefore, it is important to adjust the relative ratio of C/D to control the dispersing capability and the dispersion retention capability of the polycarboxylic acid water-reducing agent at different temperatures.

The excessively short (a molecular weight of 600) and excessively long (a molecular weight of 4000) ethylene glycol chain segments in the temperature-sensitive monomer D (Comparative Example 6 and Comparative Example 7, respectively), the excessively low content of the lactone and lactam chain segment (20%, Comparative Example 8), and the excessively low content of the temperature-sensitive unsaturated macromonomer D6 (2.5%, Comparative Example 10) will all lead to a great difference in dispersing capability with the change of the ambient temperature, indicating inadaptability to the temperature, which is consistent with the influence rule of the adsorption behavior and charge density relative to the temperature.

Although the dispersing capability when the content of the lactone and lactam chain segments is excessively high (70%, Comparative Example 9) and the content of the temperature-sensitive unsaturated macromonomer D6 is excessively high (25%, Comparative Example 11) is insensitive to the change of the ambient temperature and shows certain temperature adaptability, its dispersing capability is generally weak.

The invention claimed is:

1. A polycarboxylic acid water-reducing agent with high adaptability to temperature, wherein an unsaturated macromonomer D having a temperature-sensitive side chain is introduced in the polycarboxylic acid water-reducing agent during a synthesis process of the polycarboxylic acid water-reducing agent, wherein the unsaturated macromonomer D contains an unsaturated double bond, through free radical polymerization of which the macromonomer D is bonded to a backbone of polycarboxylic acid, and the unsaturated macromonomer D further contains a temperature-sensitive side chain;
   the unsaturated macromonomer D is prepared by a method comprising: carrying out a step-by-step addition polymerization reaction of polyethylene glycol A with a lactone or lactam monomer B to obtain an intermediate product C, and then reacting the intermediate product C with maleic anhydride to obtain the unsaturated macromonomer D containing the double bond at a terminal end and the temperature-sensitive side chain; and
   the polyethylene glycol A is commercial polyethylene glycol with hydroxyl at a terminal end, and has a number-average molecular weight of 1000-2000; in the step-by-step addition polymerization reaction of the polyethylene glycol A with the lactone or lactam monomer B, a mass fraction of the monomer B with respect to the substance A is 30-50%; and a molar ratio of the intermediate product C to the maleic anhydride is 1:2,
   wherein the polycarboxylic acid water-reducing agent is prepared by free radical polymerization of the unsaturated macromonomer D with temperature sensitivity, an unsaturated carboxylic acid monomer E, and an unsaturated polyether macromonomer F;
   a molar ratio of the unsaturated carboxylic acid monomer E to the polyether macromonomer F is 2.0-10.0;
   a mass of the unsaturated macromonomer D is 5-10% of a total mass of the monomer E and the monomer F; and
   a weight-average molecular weight of the polycarboxylic acid water-reducing agent is 20,000 to 100,000.

2. The polycarboxylic acid water-reducing agent with high adaptability to temperature according to claim 1, wherein, the unsaturated macromonomer D is prepared by a method comprising following specific steps:
   (1) preparation of the intermediate product C: adding polyethylene glycol A into a reaction flask, removing oxygen in a system by vacuumizing and introducing nitrogen for three times, then adding stannous octoate as a catalyst and heating to a set temperature, adding the lactone or lactam monomer B dropwise for a ring-opening polymerization reaction after addition of the catalyst is finished, with a dropwise addition time controlled within 2 hours to 5 hours, holding the temperature after the reaction is finished, and then cooling to room temperature to obtain the intermediate product C,
   wherein, the set temperature in the step (1) is 100-120° C., and
   in the step (1), the polyethylene glycol A and the lactone or lactam monomer B are subjected to a step-by-step addition polymerization reaction at 120-140° C., and a total time for reaction and holding the temperature is 20-24 hours; and
   (2) preparation of the monomer D: reacting the intermediate product C prepared in the step (1) with maleic anhydride at 50-80° C. for 5-10 hours to obtain the monomer D containing the double bond at the terminal end and the temperature-sensitive side chain.

3. The polycarboxylic acid water-reducing agent with high adaptability to temperature according to claim 2, wherein the lactone or lactam monomer B in the step (1) is selected from a group consisting of ε-caprolactone, caprolactam, lactide, glycolide, and mixtures thereof.

4. The polycarboxylic acid water-reducing agent with high adaptability to temperature according to claim 2, wherein, in the step-by-step addition polymerization reaction of the polyethylene glycol A with the lactone or lactam monomer B in the step (1), stannous octoate is used as a catalyst, with a mass of 0.05-0.2% of a total mass of the monomer A and the monomer B.

5. The polycarboxylic acid water-reducing agent with high adaptability to temperature according to claim 1, wherein, the unsaturated carboxylic acid monomer E is represented by a general formula (1):

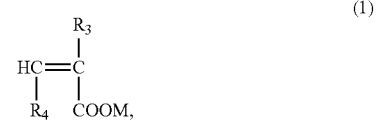

(1)

where $R_3$ is H, methyl or $CH_2COOM$, $R_4$ is H or COOM, and M is H, an alkali metal ion, an ammonium ion or an organic amine group; the unsaturated carboxylic acid monomer E mainly provides adsorption groups;
the unsaturated polyether macromonomer F is represented by a general formula (2):

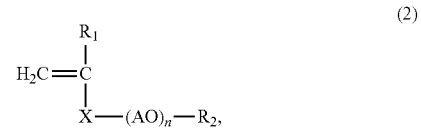

(2)

where $R_1$ is H or methyl; $R_2$ is H or C1-C4 alkyl, X is COO, O, $O(CH_2)_mO$, $CH_2O$ or $CH_2CH_2O$, m is an integer selected from 2 to 4; AO is selected from the group consisting of C2-C4 oxyalkylene, and mixtures thereof in arbitrary proportions, n is an average addition mole number of AO and is an integer selected from 20 to 100; and $(AO)_n$ is a homopolymerized, randomly copolymerized, diblock copolymerized, or multiblock copolymerized structure.

6. The polycarboxylic acid water-reducing agent with high adaptability to temperature according to claim 5, wherein, the unsaturated carboxylic acid monomer E is selected from the group consisting of acrylic acid, methacrylic acid, maleic acid, sodium salt, potassium salt and ammonium salt of acrylic acid, methacrylic acid and maleic acid, and mixtures in arbitrary proportions.

7. The polycarboxylic acid water-reducing agent with high adaptability to temperature according to claim 5, wherein, the unsaturated polyether macromonomer F is selected from methyl allyl polyethylene glycol, isopentenyl polyethylene glycol, allyl polyethylene glycol, vinyl polyethylene glycol, hydroxybutyl vinyl polyethylene glycol, or a mixture thereof in an arbitrary proportion.

8. The method for preparing the polycarboxylic acid water-reducing agent with high adaptability to temperature according to claim 7, wherein the method comprises:
adding a mixed aqueous solution of a polyether macromonomer F and an oxidant O into a reaction vessel before a polymerization reaction starts; heating to a set polymerization temperature, removing oxygen by introducing nitrogen and vacuumizing, then dropwise adding a mixed aqueous solution of an unsaturated carboxylic acid monomer E, an unsaturated macromonomer D with temperature sensitivity, a reductant R and a chain transfer agent T into the reaction vessel for the polymerization reaction, and reacting at a constant temperature for a period of time after dropwise addition is finished to obtain the polycarboxylic acid water-reducing agent,
wherein a polymerization concentration is 30-60 wt %, a polymerization temperature is 30-60° C., an addition time of the mixed aqueous solution of the monomer E, the unsaturated macromonomer D with temperature sensitivity, the reductant R and the chain transfer agent T is controlled within 2-5 hours, and the reaction at the constant temperature is continued for 1-3 hours after the addition is finished.

9. The method for preparing the polycarboxylic acid water-reducing agent with high adaptability to temperature according to claim 8, wherein a redox-based initiator is adopted for the polymerization, the oxidant O is selected from hydrogen peroxide, potassium persulfate, ammonium persulfate, sodium persulfate, or a mixture thereof, and a molar quantity of the oxidant O is 1-5% of a total molar quantity of polymerization monomers; and the reductant R is selected from L-ascorbic acid, sodium formaldehyde sulfoxylate, ferrous sulfate heptahydrate, sodium bisulfite, or a mixture thereof, and a molar quantity of the reductant is 20-50% of a total molar quantity of the oxidant; and
the chain transfer agent T is selected from mercaptopropionic acid, mercaptoacetic acid, mercaptoethanol, or a mixture thereof, and a molar quantity of the chain transfer agent is 1-5% of the total molar quantity of the polymerization monomers.

\* \* \* \* \*